(12) United States Patent
Kancharla (10) Patent No.: US 9,207,703 B1
(45) Date of Patent: Dec. 8, 2015

(54) METHOD AND APPARATUS FOR CLIENT APPLICATION CUSTOMIZATION

(75) Inventor: Gopi K. Kancharla, Summit, NJ (US)

(73) Assignee: EMC Corporation, Hopkinton, MA (US)

( * ) Notice: Subject to any disclaimer, the term of this patent is extended or adjusted under 35 U.S.C. 154(b) by 422 days.

(21) Appl. No.: 13/536,583

(22) Filed: Jun. 28, 2012

(51) Int. Cl.
*G06F 15/16* (2006.01)
*G06F 1/00* (2006.01)

(52) U.S. Cl.
CPC ............................. *G06F 1/00* (2013.01)

(58) Field of Classification Search
CPC ................................ G06F 1/00; G06F 210/00
USPC ............................................................ 709/219
See application file for complete search history.

(56) References Cited

U.S. PATENT DOCUMENTS

| | | | | |
|---|---|---|---|---|
| 7,713,065 B2* | 5/2010 | Rogers | ............... | G06Q 50/205 434/322 |
| 7,792,903 B2* | 9/2010 | Fischer | ............... | G06Q 10/10 709/205 |
| 8,185,584 B2* | 5/2012 | Fischer | ............... | G06Q 10/10 709/204 |
| 8,191,000 B2* | 5/2012 | Fischer | ............... | G06Q 10/10 709/207 |
| 8,224,750 B1* | 7/2012 | Bennett | ............... | G06F 21/10 705/51 |
| 8,295,490 B1* | 10/2012 | McCoy et al. | ............... | 380/279 |
| 8,612,483 B2* | 12/2013 | Fischer | ............... | G06F 17/30867 707/784 |
| 8,615,550 B2* | 12/2013 | Fischer | ............... | G06Q 90/00 370/260 |
| 8,626,837 B2* | 1/2014 | Fisher | ............... | G06Q 10/10 709/204 |
| 8,688,742 B2* | 4/2014 | Fischer | ............... | G06Q 30/02 707/791 |
| 2005/0091184 A1* | 4/2005 | Seshadri et al. | ............... | 707/1 |
| 2005/0091269 A1* | 4/2005 | Gerber | ............... | G06F 9/44505 |
| 2005/0091674 A1* | 4/2005 | Knight | ............... | G06F 9/4428 719/332 |
| 2006/0274662 A1* | 12/2006 | Tannenbaum | ....... | H04L 41/022 370/242 |
| 2008/0155425 A1* | 6/2008 | Murthy et al. | ............... | 715/738 |
| 2010/0146523 A1* | 6/2010 | Brigaut et al. | ............... | 719/330 |
| 2010/0198972 A1* | 8/2010 | Umbehocker | ............... | 709/226 |
| 2014/0304379 A1* | 10/2014 | Samaniego | ....... | H04N 21/47205 709/221 |

\* cited by examiner

*Primary Examiner* — Alicia Baturay
(74) *Attorney, Agent, or Firm* — Daly, Crowley Mofford & Durkee, LLP (57) ABSTRACT

Methods and apparatus to provide client application customization including requesting and receiving, by a client browser on a client machine, a first file from a server, running the first file as a client application, which looks to identify user preferences on the client machine, reading, parsing and loading into memory, by a computer processor on the client application, the identified user preferences as action scripts, and rendering the application using the action scripts. This arrangement saves server resources by customization being performed locally.

17 Claims, 10 Drawing Sheets

METHOD AND APPARATUS FOR CLIENT APPLICATION CUSTOMIZATION

BACKGROUND

As is known in the art, storage systems, such as cloud storage systems, contain a relatively large number of hardware devices and components and software applications, modules, and components. With many different infrastructure devices and applications in the cloud storage system, there can be significant client customization. In conventional systems, servers must maintain a significant amount of user customization information for populating and rendering web pages with user preferences.

In general, web pages rendered by browsers are constructed at the server after applying its preferences and modifications at the server. Any client side changes in these pages are transmitted to and from the client and the server, which are preserved at the server end specific to each user. When the client customizes the user interface (UI) components, the changes are sent to server. At the next client login, before sending pages to the client, the server processes and populates the pages after applying the preserved user preferences.

SUMMARY

In one aspect of the invention, a method comprises: requesting and receiving, by a client browser on a client machine, a first file from a server, running the first file as a client application, which looks to identify user preferences on the client machine, reading, parsing and loading into memory, by a computer processor on the client application, the identified user preferences as action scripts, and rendering the application using the action scripts.

The method can further include more or more of the following features: first file comprises a .swf file, the first file enables multimedia, vector graphics, and action scripts, the user preferences are encrypted on the client machine, sending status of preferences saved on the client machine to the client browser, and sending the status to the client application, the user preferences are saved in XML, checking for an update of the user preferences, the user preferences enable for a view at least one of the following: adding, renaming the view, removing the view, ordering multiple views, adding columns inside the view, removing columns inside the view, ordering multiple columns inside the view from a settings menu option, ordering multiple columns inside the view by the user, sorting for each column inside the specific view, a refresh interval for each of the specific views, column width for each visible column, showing and hiding a filter panel specific to the view, showing values inside the filter panel specific to the view, and/or the client machine is coupled to a cloud computing system having cloud components including at least one of a fabric interconnect in a compute layer, a switch in a network layer, and a storage array in a storage layer, the cloud computing system having a management layer.

In another aspect of the invention, an article comprises: a computer readable medium containing non-transitory stored instructions that enable a machine to perform: requesting and receiving, by a client browser on a client machine, a first file from a server, running the first file as a client application, which looks to identify user preferences on the client machine, reading, parsing and loading into memory, by the client application, the identified user preferences as action scripts, and rendering the application using the action scripts.

The article can further include one or more of the following features: the first file comprises a .swf file, the first file enables multimedia, vector graphics, and action scripts, the user preferences are encrypted on the client machine, sending status of preferences saved on the client machine to the client browser, and sending the status to the client application, checking for an update of the user preferences, the user preferences enable for a view at least one of the following: adding, renaming the view, removing the view, ordering multiple views, adding columns inside the view, removing columns inside the view, ordering multiple columns inside the view from a settings menu option, ordering multiple columns inside the view by the user, sorting for each column inside the specific view, a refresh interval for each of the specific views, column width for each visible column, showing and hiding a filter panel specific to the view, showing values inside the filter panel specific to the view, and/or the client machine is coupled to a cloud computing system having cloud components including at least one of a fabric interconnect in a compute layer, a switch in a network layer, and a storage array in a storage layer, the cloud computing system having a management layer.

In a further aspect of the invention, a system comprises: a processor, and a memory containing stored instructions that enable the system to: request and receive, by a client browser on a client machine, a first file from a server, run the first file as a client application, which looks to identify user preferences on the client machine, read, parse and load into memory, the identified user preferences as action scripts, and render the application using the action scripts. In one embodiment, the first file comprises a .swf file.

BRIEF DESCRIPTION OF THE DRAWINGS

The foregoing features of this invention, as well as the invention itself, may be more fully understood from the following description of the drawings in which.

DETAILED DESCRIPTION

Figure 1:
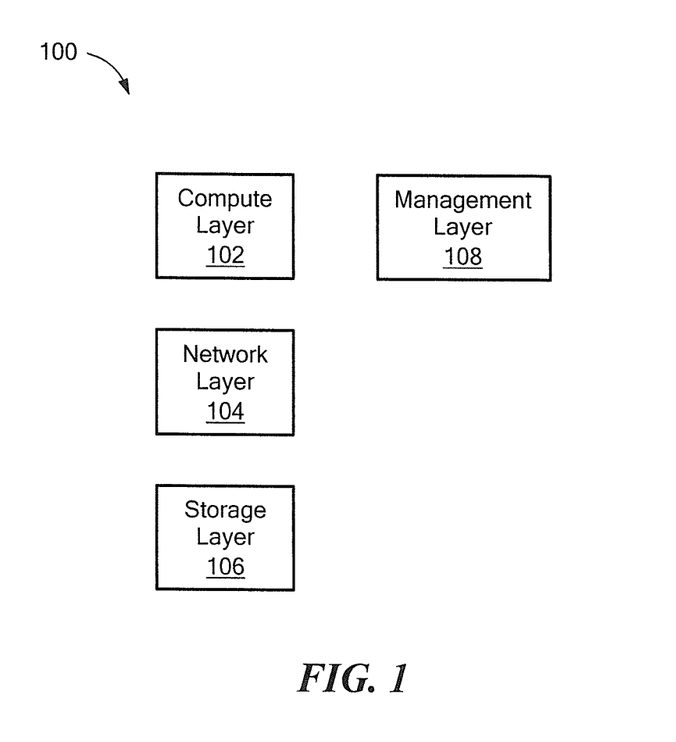
FIG. 1 is a high level schematic representation of a cloud storage system having client application customization in accordance with exemplary embodiments of the invention.

FIG. 1 shows an exemplary cloud storage environment 100 having client application customization in accordance with exemplary embodiments of the invention. The environment includes a compute domain 102, a network domain 104, a storage domain 106, and a management domain 108. The environment may be referred to as a platform. It is understood that any practical number of platforms can be combined into a cloud storage environment.

The compute domain 102 comprises components, such as blade servers, chassis and fabric interconnects that provide the computing power for the platform. The storage domain 106 comprises the storage components for the platform. The network domain 104 comprises the components that provide switching and routing between the compute and storage domains 102, 106 within and between platforms, and to the client or customer network.

Figure 2:
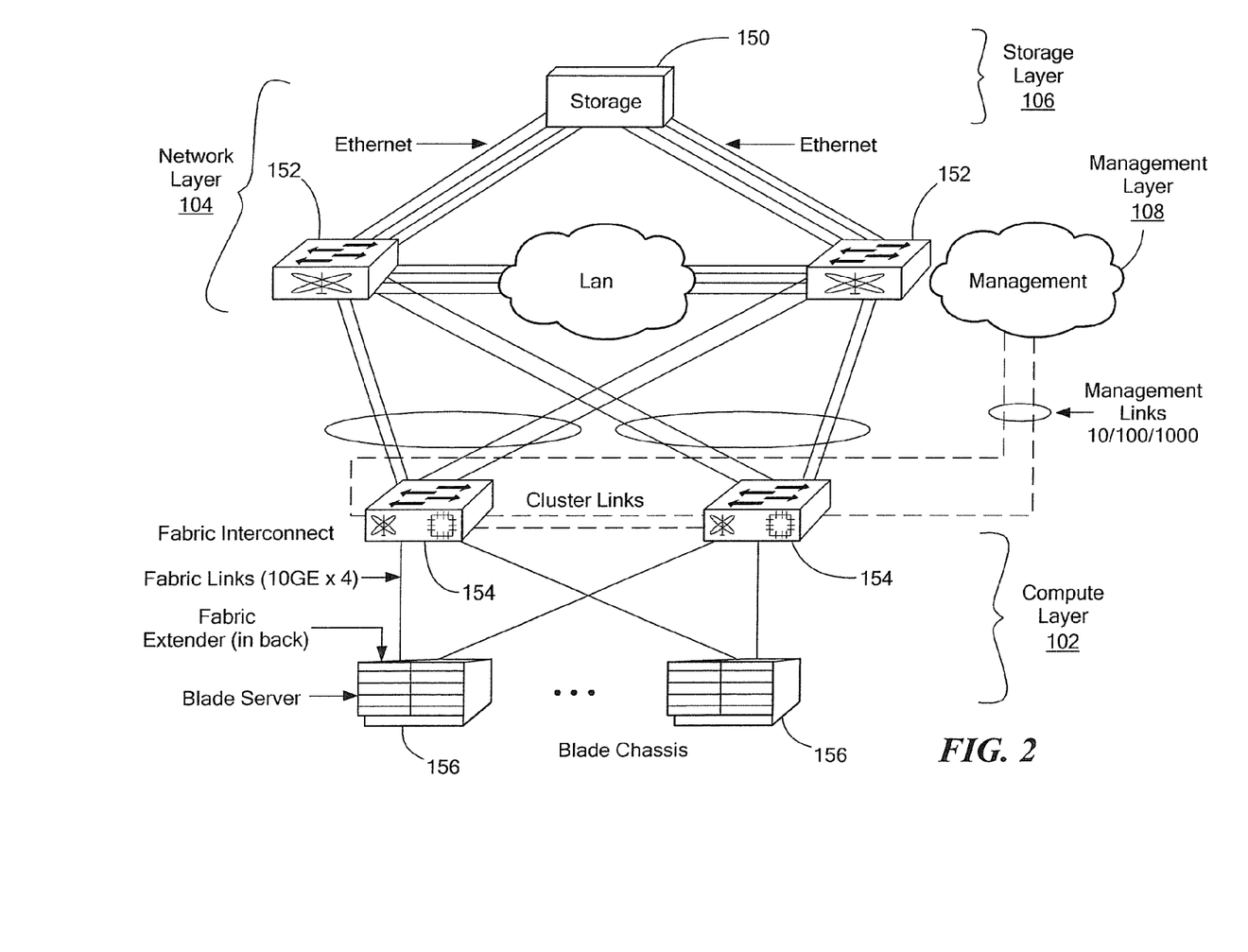
FIG. 2 is a schematic representation showing further detail of the cloud storage system of FIG. 1 including interconnections.

FIG. 2 shows further detail for the environment 100 of FIG. 1. The storage domain 106 can include storage components 150, such as CLARIION storage components from EMC Corporation of Hopkinton Mass. The network domain 104 can include a pair of switches 152, such as MDS 9000 Series Multilayer SAN Switches from Cisco of San Jose, Calif., coupled to the storage components and to a LAN. The compute domain 102 can include a pair of fabric interconnects 154, such as CISCO 6100 series devices. The compute domain can further include a number of blade servers 156, such as CISCO 5100 blade chassis. The management domain 108 can be coupled to the compute domain 102.

Figure 3:
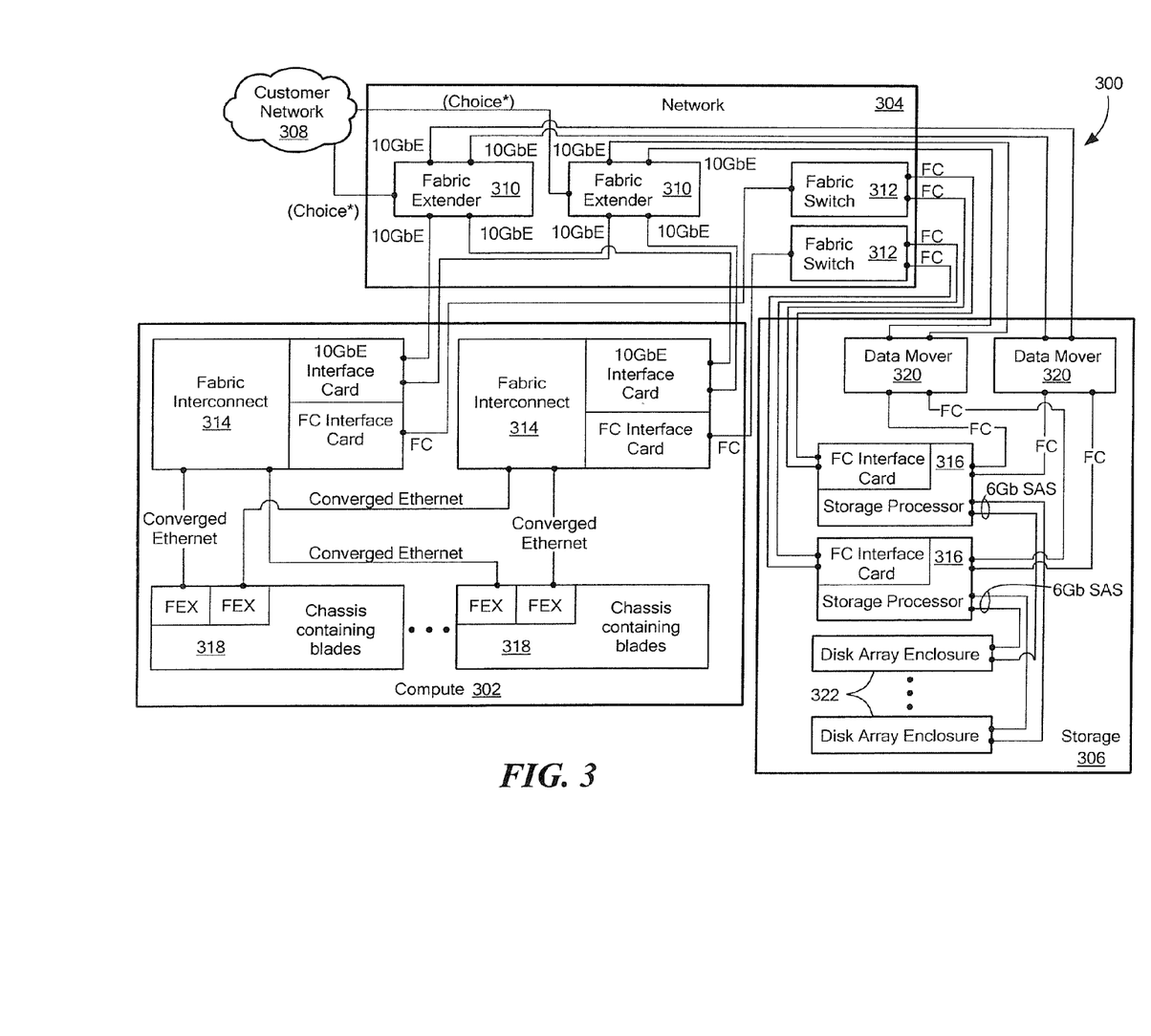
FIG. 3 is a schematic representation showing further detail of the cloud storage system of FIG. 2 including system components.
Figure 4:
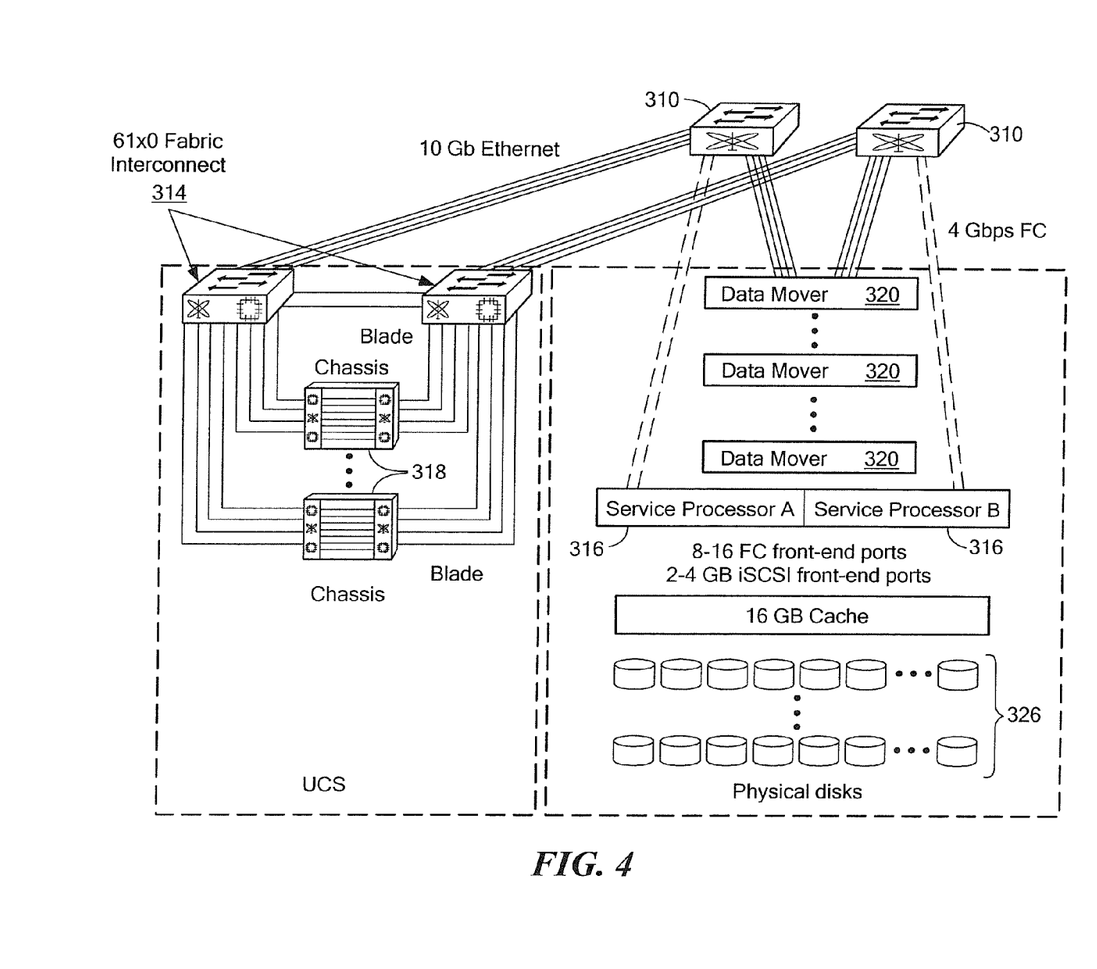
FIG. 4 is a schematic representation showing further detail of a storage domain of the cloud storage system of FIG. 3 using NAS for the storage domain.

FIG. 3 shows further detail of an exemplary cloud environment having a compute domain 302, a network domain 304 and a storage domain 306. The network domain 302 is coupled to a customer network 308 in a manner known in the art. The network domain 302 includes switches 310 coupled to the customer network 308. The network domain 302 also includes multilayer fabric switches 312 coupled to fabric interconnects 314 in the compute domain 302 and to storage processors 316 in the storage domain 306. The fabric interconnects 314 are coupled to blade server chassis 318 containing blades. Data movers 320 in the storage domain 306 are coupled between the storage processors 316 and the switches 310 in the network domain. Disk array enclosures 322 are coupled to the storage processors 316. FIG. 4 shows interconnections for a system similar to that shown in FIG. 3 with physical disks 326. In the illustrated embodiment, the storage domain includes 8 to 16 front end fibre channel ports and 2-4 GB iSCSI front end ports. It is understood that a variety of other configurations having different interconnections and storage configuration can be provided to meet the needs of a particular application.

The management domain can include a number of applications to perform various functions for overall control, configuration, etc of the various platform components. For example, management applications can include a virtualization function, such as VSPHERE/VCENTER, by VMware of Palto Alto, Calif. A further management application can be provided as the Unified Computing System (UCS) by Cisco. It is understood that the blade chassis and fabric interconnection can be considered part of the UCS. Another management application can includes a management interface, such as EMC UNISPHERE, to provide a flexible, integrated experience for managing existing storage systems, such as CLARIION and CELERRA storage devices from EMC. A further management application includes a platform element manager, such as Unified Infrastructure Manager (UIM) by EMC, for managing the configuration, provisioning, and compliance of the platform.

Figure 5:
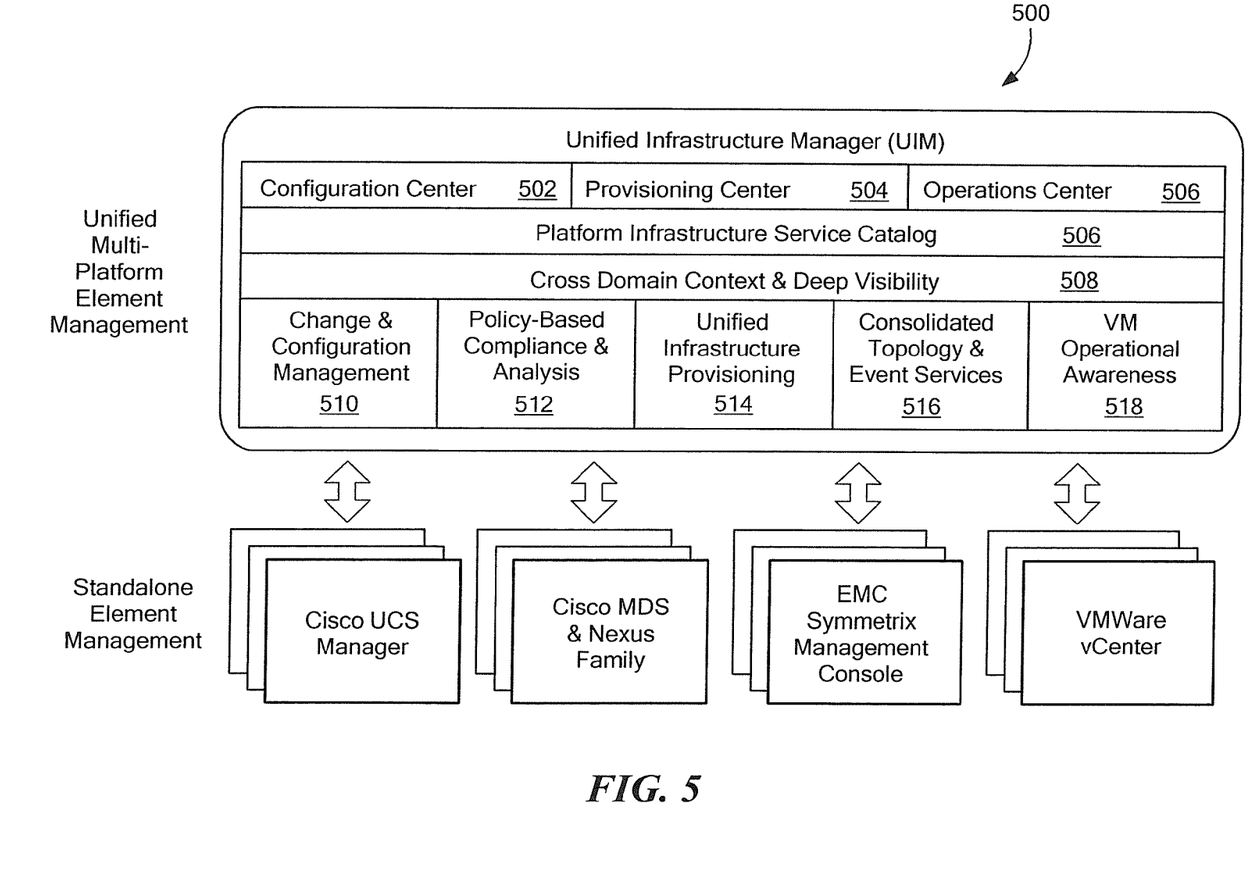
FIG. 5 is a schematic representation of a unified infrastructure manager (UIM) module showing component layering.

FIG. 5 shows an exemplary unified infrastructure manager 500 having command abstraction in accordance with exemplary embodiments of the invention. In one embodiment, the unified infrastructure manager 500 includes a configuration center module 502, a provisioning center module 504, and an operations center module 506. Below these modules is a platform infrastructure service catalog 506 and a cross domain context and visibility module 508.

The unified infrastructure manager 500 further includes a change and configuration management module 510, a policy-based compliance and analysis module 512, a unified infrastructure provisioning module 514, a consolidation topology and event service module 516, and an operational awareness module 518. The various modules interact with platform elements, such as devices in compute, network and storage domains, and other management applications.

In one aspect of the invention, a uniform infrastructure management module includes client application customization automatically at the client based upon preferences saved by the user. In general, a client machines requests and receives a file, such as a SWF/flash file, from the server. The downloaded file runs and looks for existing user preferences, which are loaded into memory as action script objects. During rendering at the screen gets painted, these objects get customized in accordance with the saved preferences.

It is understood that various vendor specific terminology, product name, jargon, etc., may be used herein. It is further understood that such vendor specific information is used to facilitate an understanding of embodiments of the invention and should not limit the invention in any way. Any specific vendor information should be construed mean a generic product, function, or module.

Some exemplary items are set forth below. It is understood that one of ordinary skill in the art is familiar with the generic architecture and functionality of a vendor specific terms.

UIM/Provisioning or UIM/P: EMC Unified Infrastructure Management/Provisioning that provides simplified management for VCE VBLOCK by managing the components of VBLOCK platforms as a single entity and easily define and create infrastructure service profiles to match business requirements.

Cisco UCS: Cisco Unified Computing System.

VMWARE VSPHERE: A virtualization platform for building cloud infrastructures

ESX/ESXi: An enterprise-level computer virtualization product offered by VMware.

VM: Virtual Machine

VBLOCK: A pre-architected and pre-qualified environment for virtualization at scale: storage, fabric, compute, hypervisor, management and security.

Model Service Adapter: A service that uses the RESTful interface to expose the types of resources and instances of the data sources.

vApp: Virtual Application vCD: VMware vCloud Director

While exemplary embodiments of the invention are shown and described in conjunction with particular client, server, application, and browser configurations, including SWF/flash, for client customization, it is understood that alternative embodiments can include other applications and configurations readily understood by one of ordinary skill in the art well within the scope of the claimed invention.

As is well known in the art, SWF is an ADOBE FLASH file format used for multimedia, vector graphics, and ACTIONSCRIPT object-oriented programming language from Macromedia Inc. SWF files can contain animations or applets of varying degrees of interactivity and function. A variety of well-known applications can generate files in the SWF format.

Exemplary embodiments of the invention provide more efficient user preference utilization by customizing client applications that are loaded in the client browsers. The applications are customized automatically at the client itself based on the preferences saved by the user, dynamically at runtime even before rendering to view and immediately after download to client.

Figure 6:
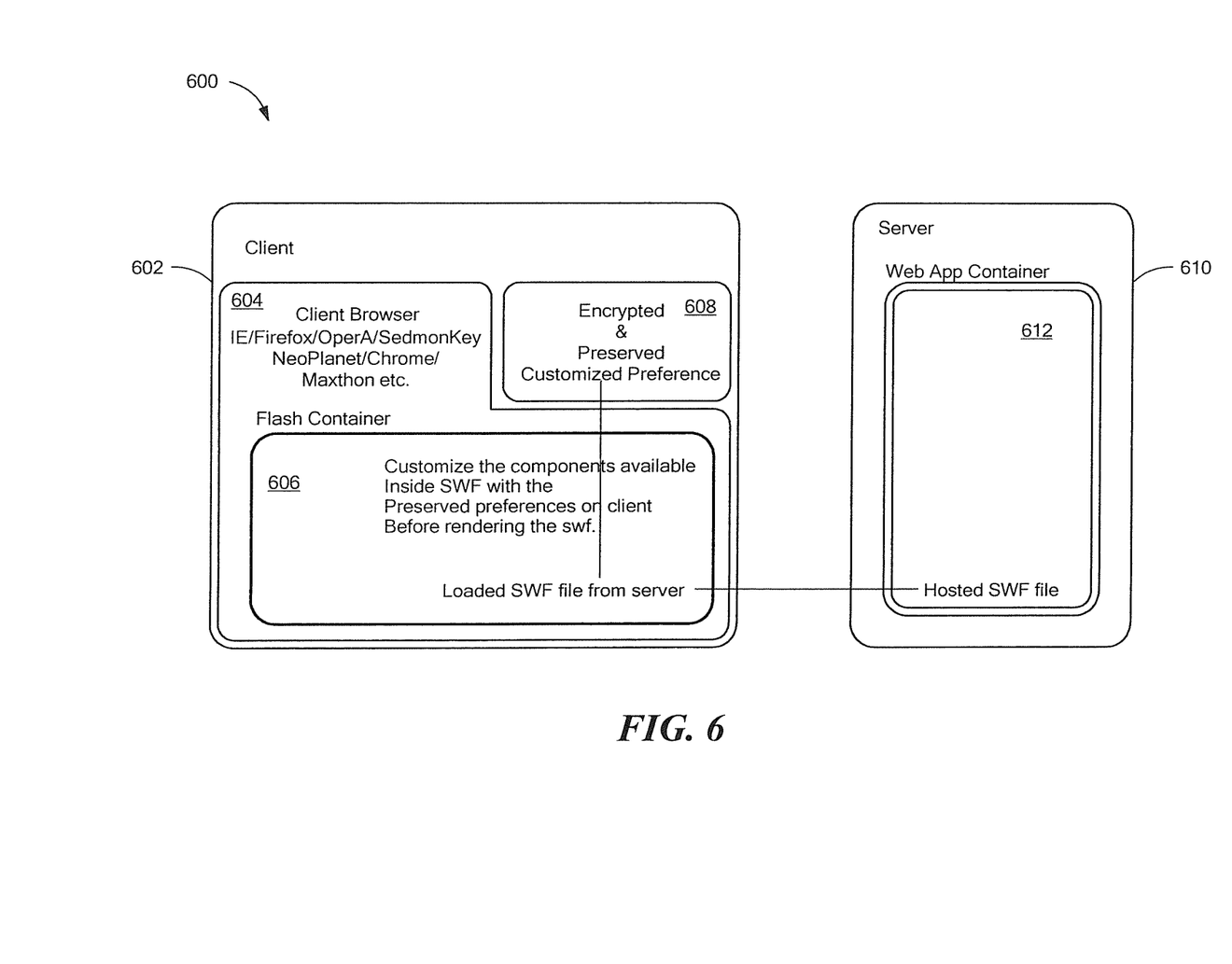
FIG. 6 is a schematic representation of a client machine having user customization coupled to a server.

FIG. 6 shows an exemplary high level block diagram for a system 600 having client application customization in accordance with exemplary embodiments of the invention. A client machine 602 includes a client browser 604, which can be provided as any suitable browser, such as FIREFOX, INTERNET EXPLORER, etc. The client browser 604 includes a flash container 606 having stored user preferences and a loaded SWF file from the server. The client machine 602 also includes customized user preferences 608. The client machine 602 is connected to a server 610, which has a web application container 612 with a hosted SWF file.

In general, the user sends the request to the server 610 using the client browser 604. The server 610 responds with the SWF/Flash file to load on the client 602. An embedded/plugged-in flash container 606 starts running the SWF/Flash file after finishing the download. The downloaded SWF/Flash file begins to look for preferences 608 at the client machine that are already available or saved. If the corresponding preferences 608 are available, the currently running Flash/SWF file reads, parses and loads the preferences into the memory as action script objects. During its rendering time, e.g., when the screen is actually getting painted at runtime, these components get customized as per the saved preferences one by one. The container 606 then gets notified for visualization.

With this arrangement, the use of network resources is reduced, the use of memory at the server is reduced, the use of server processing resources is reduced, server response time is decreased, and the amount of server-side scripting is reduced.

The exemplary list of features below should function when a user is performing operations during a login session:

Saving and the User Preference for Adding a new VIEW.
Saving the User Preference for Renaming a VIEW.
Saving the User Preference for Removing a VIEW
Saving the User Preference for ordering multiple VIEWS (drag and drop).
Saving the User Preferences for each specific above View(s).(multiple views)
Saving the User Preference for Adding Columns inside a (each) view.
Saving the User Preference for Removing Columns inside a view.
Saving the User Preference for Ordering Multiple Columns inside a view from Settings menu option.
Saving the User Preference for Ordering Multiple Columns inside a view by the user Drag Operation.
Saving the User Preference for Sort for each column inside a specific view.
Saving the User Preference for Refresh Interval for each specific view.
Saving the User Preference for Column Width for each visible column, specific to a view.
    Saving the User Preference for Showing and Hiding the filter panel specific to each view.
Saving the User Preference for Showing the values inside filter panel specific to each view.
Saving the User Preferences Manually.
Restoring last saved User Preference.
Restore to default view.

The exemplary features listed below function when user opens the application with another session.

Adding a view or views upon applying the saved preferences accordingly.
Renaming the view(s) upon applying the saved preference accordingly.
Removing the view(s) upon applying the saved preference accordingly.
Ordering the views upon applying the saved preference accordingly.
Adding the columns inside each specific view (multiple views) and applying the saved preferences if any.
Removing the columns inside each view (multiple views) and applying the saved preferences if any.
Ordering the columns inside each view specified and applying the saved preferences operated either from Settings menu or by user mouse dragging.
Sorting the each column inside each view specified and applying the saved preference if any.
Identifying the width of saved column specific to a view and applying the saved preference if any.
Identifying the Refresh interval of each view and applying the saved preference if any.
Identifying whether to show the filter panel or not and applying the saved preference if any.
Identifying and loading the filter conditions into filter panel specific to each view and applying the saved preference if any.

Figure 7:
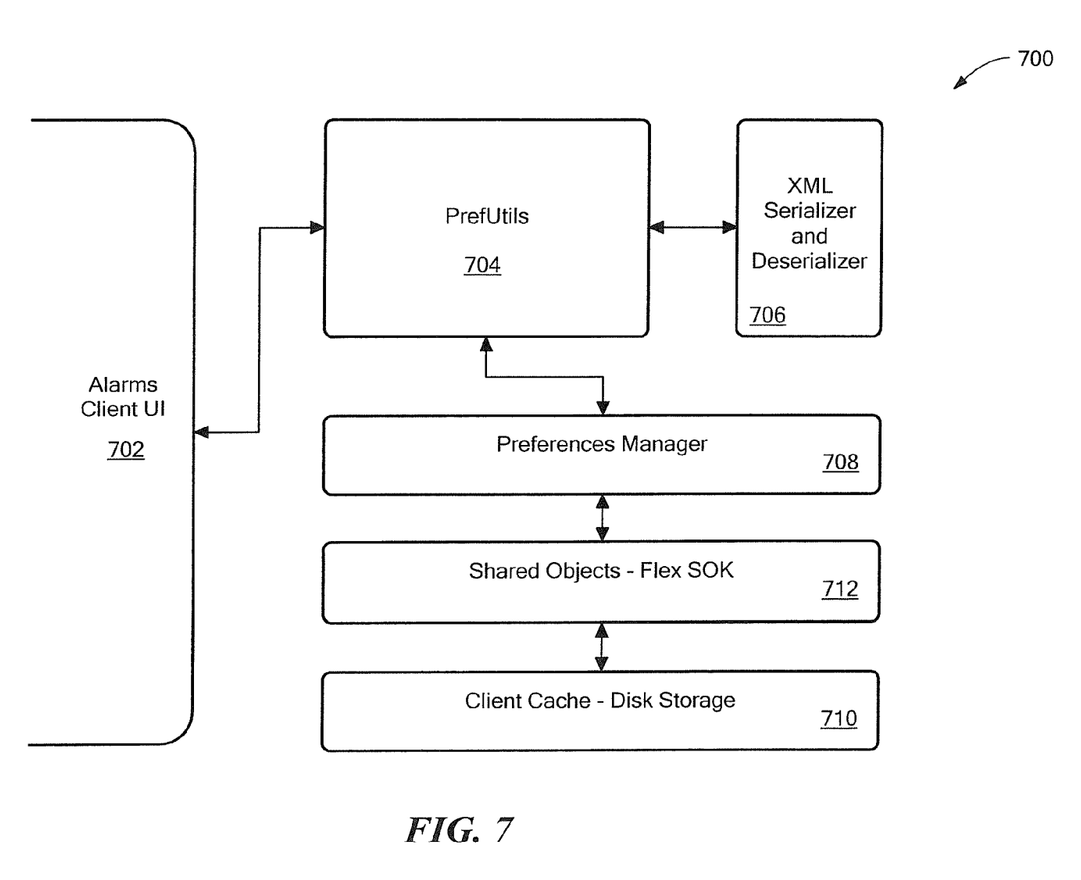
FIG. 7 is a schematic representation of user preferences saved at the client side in the format of XML.

FIG. 7 shows an exemplary implementation 700 in which user preferences are saved at the client side in XML format. Each valid user operation is captured in an Alarms UI module 702 and the operation result is sent to PrefUtils Object 704, which is a singleton, i.e., a variable referred to only once. The PrefUtils object 704 checks whether a user preference update is necessary, and commands a serializer/deserializer module 706 to serialize the object into XML. The serialized XML is given to a preferences manager module 708 requesting storage of the XML into cache 710 as a string via a shared objects module 712.

The process is the same when applying the preferences into the UI when it is rendering a web page: the PrefUtils object 704 first checks for existing preferences. If the preferences are available, retrieved string information is converted into XML and then un-marshalled into a collection of ActionScript objects (View) and the preferences are applied.

The XML structure can be checked for specific attributes that represents valid preferences, as described below. Loading of filter values into the filter panel can be performed as follows. By default the filter panel is loaded with the static XML provided as an input. Modifying the static XML at the run time automatically updates the filter panel with the saved preference value.

Figure 8:
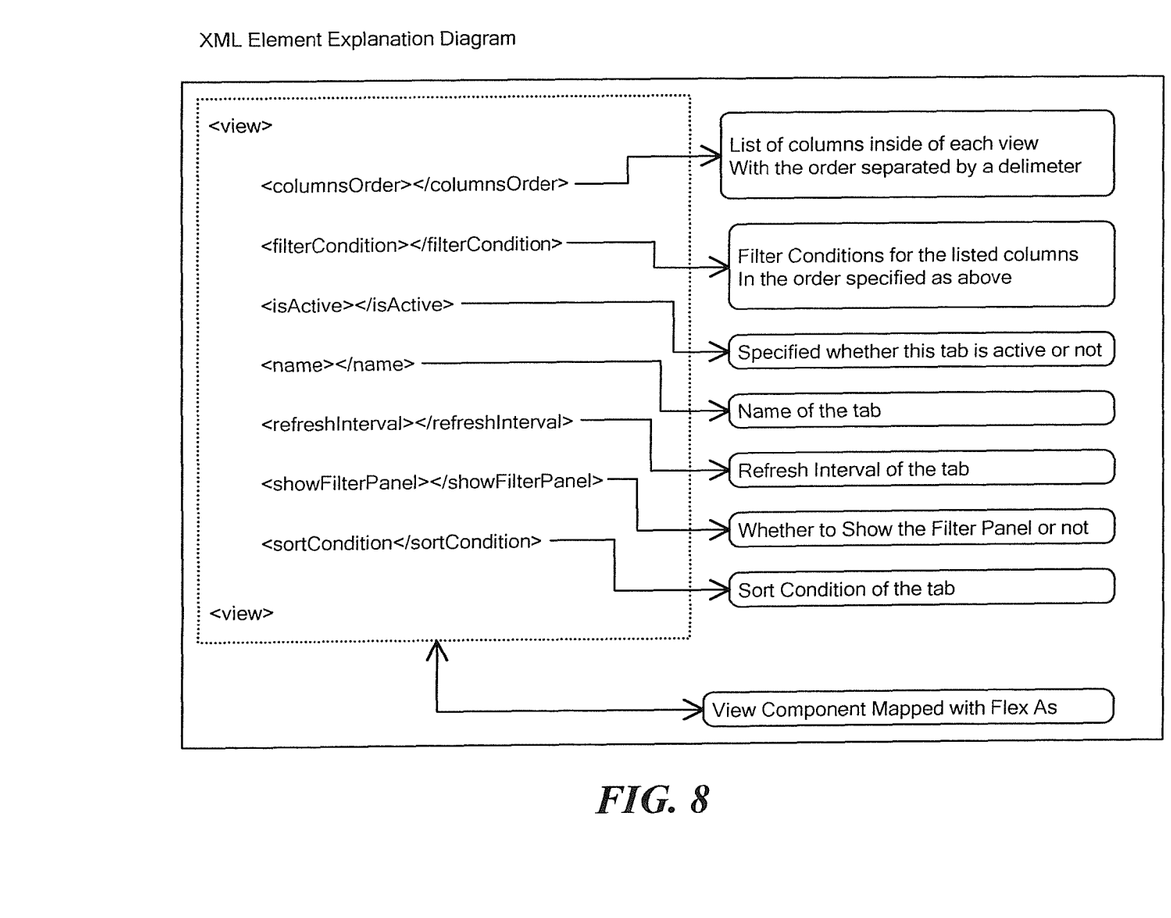
FIG. 8 is a representation of XML elements.

An exemplary XML, structure is set forth below and FIG. 8 provides an XML element explanation diagram.

<views >
    <view >
    <columnsOrder>Severity_: :_RcaType_: :_AffectedComponent_:    :_ComponentType_:    :_Service Count_:    :_VblockName_:    :_LastUpdatedTime_: :_Count_: :_State_: :_
    <\columnsOrder>
    <filterCondition>
    <columns>
    null<column name="State">
    <prefAttributes>
    <prefAttribute>
    <name>default<\name>
    <value>^ACTIVE$<\value>
    <\prefAttribute><prefAttribute>
    <name>compareOperator<\name>
    <value>contains<\value>

```
<\prefAttributes>
<\prefAttributes>
<\column>null<column
    name="ComponentType">
<prefAttributes>
<prefAttribute>
<name>default<\name>
<value>UIM<\value>
<\prefAttribute><prefAttribute>
<name>compareOperator<\name>
<value>contains<\value>
<\prefAttribute>
<\prefAttributes>
<\column><\columns>
<\filterCondition>
<isActive>true<\isActive>
<name>View<\name>
<refreshInterval>900000<\refreshInterval>
<showFilterPanel>false<\showFilterPanel>
<sortCondition>&s=Severity:ASC:
    NUM&s=LastUpdatedTime:DESC<\sortCondition>
<\view>
<view>
<columnsOrder>Severity_: :_RcaType_: :_AffectedComponent_:      :_ComponentType_:      :_Service
    Count_:    :_VblockName_:       :_LastUpdated
    Time_: :_Count_: :_State_: :_
<\columnsOrder><filterCondition>
<columns>
null<column name="State">
<prefAttributes>
<prefAttribute>
<name>default<\name>
<value>^ACTIVE$<\value>
<\prefAttribute><prefAttribute>
<name>compareOperator<\name>
<value>contains<\value>
<\prefAttribute>
<\prefAttributes>
<\column>null<column
    name="ComponentType">
<prefAttributes>
<prefAttribute>
<name>default<\name>
<value>UIM<\value>
<\prefAttribute><prefAttribute>
<name>compareOperator<\name>
<value>contains<\value>
<\prefAttribute>
<\prefAttributes>
<\column><\columns>
<\filterCondition>
<isActive>true<\isActive>
<name>View2<\name><refreshInterval>900000
    <\refreshInterval>
<showFilterPanel>true<\showFilterPanel>
<sortCondition>&s=Severity:ASC:
    NUM&s=LastUpdatedTime:DESC<\sortCondition>
<\view>
<view>
<columnsOrder>Severity_: :_RcaType_: :_AffectedComponent_:      :_ComponentType_:      :_Service
    Count_:    :_VblockName_:       :_LastUpdated
    Time_: :_Count_: :_State_: :_
<\columnsOrder><filterCondition>
<columns>
null<column name="State">
<prefAttributes>
<prefAttribute>
<name>default<\name>
<value>^ACTIVE$<\value>
<\prefAttribute><prefAttribute>
<name>compareOperator<\name>
<value>contains<\value>
<\prefAttribute>
<\prefAttributes>
<\column>null<column
    name="ComponentType">
<prefAttributes>
<prefAttribute>
<name>default<\name>
<value>UIM<\value>
<\prefAttribute><prefAttribute>
<name>compareOperator<\name>
<value>contains<\value>
<\prefAttribute>
<\prefAttributes>
<\column><\columns>
<\filterCondition>
<isActive>true<\isActive>
<name>View3<\name>
<showFilterPanel>false<\showFilterPanel>
    <refreshInterval>900000<\refreshInterval>
<sortCondition>&s=Severity:ASC:
    NUM&s=LastUpdatedTime:DESC<\sortCondition>
<\view>
<view>
<columnsOrder>Severity_: :_RcaType_: :_AffectedComponent_:      :_ComponentType_:      :_Service
    Count_:    :_VblockName_:       :_LastUpdated
    Time_: :_Count_: :_State_: :_
<\columnsOrder><filterCondition>
<columns>
null<column name="State">
<prefAttributes>
<prefAttribute>
<name>default<\name>
<value>^ACTIVE$<\value>
<\prefAttribute><prefAttribute>
<name>compareOperator<\name>
<value>contains<\value>
<\prefAttribute>
<\prefAttributes>
<\column>null<column
    name="ComponentType">
<prefAttributes>
<prefAttribute>
<name>default<\name>
<value>UIM<\value>
<\prefAttribute><prefAttribute>
<name>compareOperator<\name>
<value>contains<\value>
<\prefAttribute>
<\prefAttributes>
<\column><\columns>
```

```
<\filterCondition>
<isActive>true<\isActive>
<name>View4<\name>
<showFilterPanel>false<\showFilterPanel>
    <refreshInterval>900000<\refreshInterval>
<sortCondition>&s=Severity:ASC:
    NUM&s=LastUpdatedTime:DESC<\sortCondition>
<\view>
<\views>
```

In one embodiment, there is a cached information location at the client. It is understood that this file should not be edited since that would corrupt the file encryption leads to fail the preferences loading. An exemplary path is:

C:\Documents and Settings\kanchg\Application Data\Macromedia\FlashPlayer\#SharedObjects\ XGYBX738\lglom101.lss.emc.com\console\don-julio-flexapp.Swf.

It should be noted that these folders might be hidden so that show hidden folders should be enabled to see hidden folders in windows. For example, in Internet Explorer:

Open Explorer
→Click on Tools Menu
→Click on Folder Options
→Click on View tab
→Under the Hidden files and folders
→select "Show hidden files and folders" radio option and then click on OK.

As discussed above, current user preferences are exported. An exemplary set of steps to export user preferences is set forth below:

Step 1: Find out the flash player's cache file. The extension of the file is .sol and in most cases name will look like this:
ecuitApp_appadmin_SharedObject.sol
Location: C:\Documents and Settings\<USER NAME>\Application Data\Macromedia\Flash Player\#SharedObjects\XXXXXXXX\<DOMAIN NAME>\console\don-julio-flex-app.swf Step 2: Copy the above file and save it at a secured place, This will finish the exporting job. Note that editing this file or renaming this file in any case for anything at any time will break the file to load while importing.

The saved user preferences are then imported, as described below.

Step 1: Get the copied cache file as shown in the—Exporting the current user preferences topic.
Step 2: Find out the Flash Players cache location
Location: C:\Documents and Settings\<USER NAME>\Application Data\Macromedia\Flash Player\#SharedObjects\XXXXXXXX\<DOMAIN NAME>\console\don-julio-flex-app.swf
Step 3: Replace the file in the same folder.
Step 4: Close the browser and restart the application. This should load the User Preferences specific to Alert View.

Figure 9:
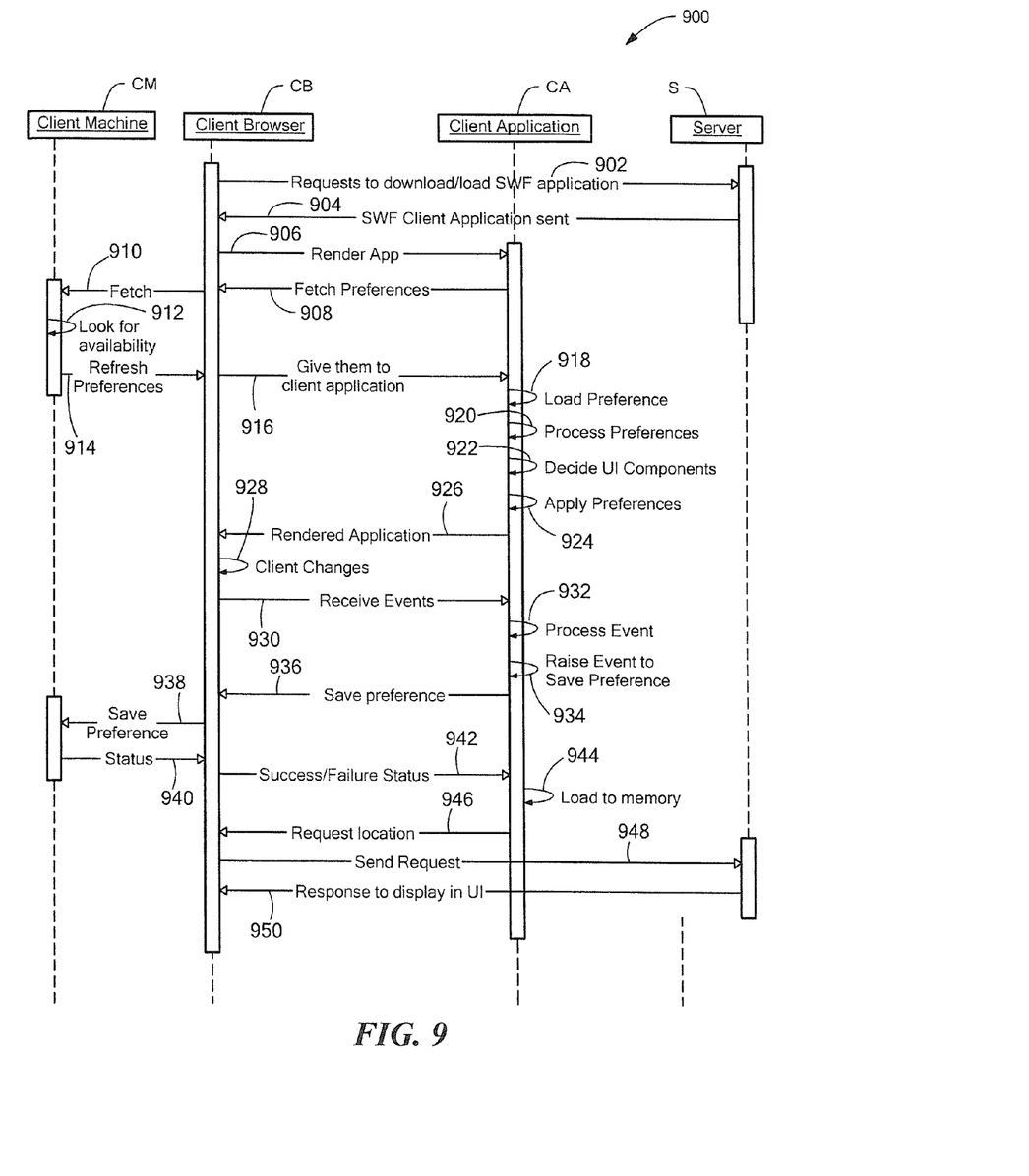
FIG. 9 is a sequence diagram to show back and forth between a client machine and a server to provide client application customization.

FIG. 9 shows an exemplary sequence of interaction 900 between a client machine CM, client browser CB, client application CA, and a server S to provide client application customization in accordance with exemplary embodiments of the invention. A client browser CB requests 902 to download a SWF application from the server S. The server S sends 904 the SWF client application to the client browser CB. The client browser CB renders 906 the client application CA for the user.

Client preference information is fetched 908 from the client application CA to the client browser CB, and then 910 to the client machine CM, which looks 912 for user preference availability. The client machine CM returns 914 user preferences to the client browser CB, which gives 916 them to the client application CA. The client application CA then loads 918 the user preferences, processes 920 the preferences, decides 922 on the user interface (UI) components, and applies 924 the preferences.

The client application CA then provides the rendered application 926 to the client browser CB, which makes the client changes 928. The client application CA then receives events 930 from the client browser CB, which processes 932 the events and raises events 934 to save user preferences. Preferences from the client application CA are saved 936 by the client browser CB. The preferences are then saved 938 to the client machine CM from the client browser CB.

Status 940 for the client machine CM is provided to the client browser CB, which provides the success/fail status information 942 to the client application. The status information is loaded 944 into memory by the client application CA. The client application CA then sends a location request 946 to the client browser CB, which sends the request 948 to the server S. The server S sends 950 a response to a display in the user interface.

Figure 10:
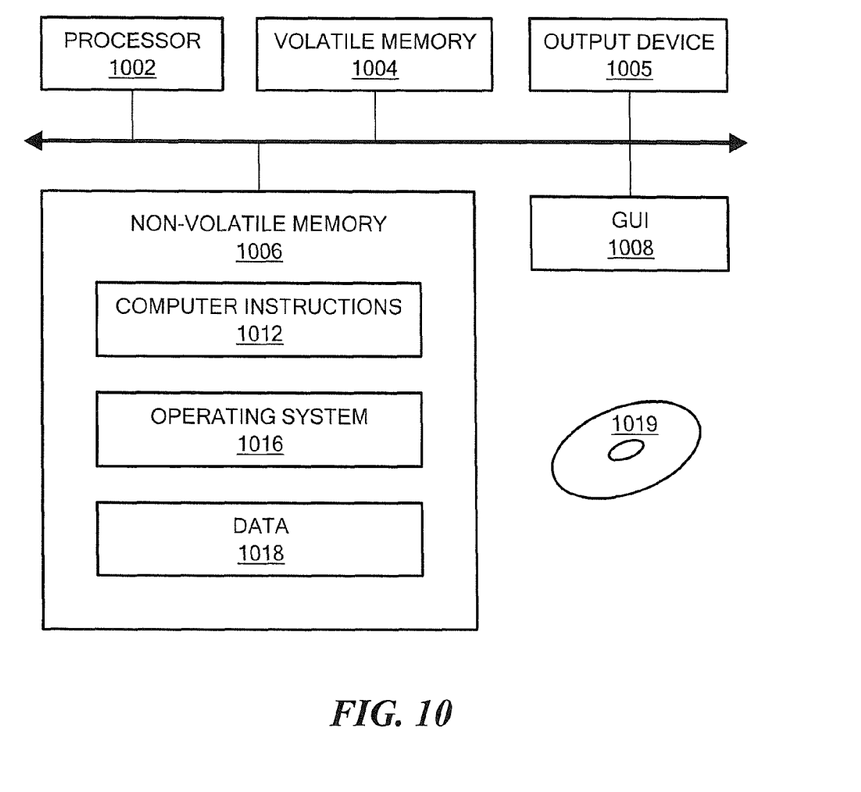
FIG. 10 is a schematic representation of an exemplary computer that can perform at least some of the processing described herein.

FIG. 10 shows an exemplary computer that can perform at least a part of the processing described herein. A computer includes a processor 1002, a volatile memory 1004, an output device 1005, a non-volatile memory 1006 (e.g., hard disk), and a graphical user interface (GUI) 1008 (e.g., a mouse, a keyboard, a display, for example). The non-volatile memory 1006 stores computer instructions 1012, an operating system 1016 and data 1018, for example. In one example, the computer instructions 1012 are executed by the processor 1002 out of volatile memory 1004 to perform all or part of the processing described above. An article 1019 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer programs may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
requesting and receiving, by a client browser on a client machine, a first file from a server;
running the first file as a client application using an embedded flash container, wherein the client application looks to identify user preferences existing on the client machine prior to the requesting of the first file, wherein the first file comprises a SWF/Flash file;
reading, parsing and loading into memory, by a computer processor on the client application, the identified user preferences as action scripts;
exporting user preferences by:
locating a cache file for the flash player; and
copying the cache file and saving the copy of the cache file without editing or renaming the cache file;
importing saved user preferences from the exported user preferences in the copy of the cache file;
closing the client browser, and restarting the first file as a client application to load the user preferences; and
rendering the application using the action scripts.

2. The method according to claim 1, wherein the first file enables multimedia, vector graphics, and action scripts.

3. The method according to claim 1, wherein the user preferences are encrypted on the client machine.

4. The method according to claim 1, further including sending status of preferences saved on the client machine to the client browser, and sending the status to the client application.

5. The method according to claim 1, wherein the user preferences are saved in XML.

6. The method according to claim 1, further including checking for an update of the user preferences.

7. The method according to claim 1, wherein the user preferences enable for a view at least one of the following: adding, renaming the view, removing the view, ordering multiple views, adding columns inside the view, removing columns inside the view, ordering multiple columns inside the view from a settings menu option, ordering multiple columns inside the view by the user, sorting for each column inside the specific view, a refresh interval for each of the specific views, column width for each visible column, showing and hiding a filter panel specific to the view, showing values inside the filter panel specific to the view.

8. The method according to claim 1, wherein the client machine is coupled to a cloud computing system having cloud components including at least one of a fabric interconnect in a compute layer, a switch in a network layer, and a storage array in a storage layer, the cloud computing system having a management layer.

9. The method according to claim 1, further including obtaining the user preferences from a cache file of a flash player on the client machine.

10. An article, comprising:
a non-transitory computer readable medium containing stored instructions that enable a machine to perform:
requesting and receiving, by a client browser on a client machine, a first file from a server;
running the first file as a client application, which looks to identify user preferences existing on the client machine prior to the requesting of the first file;
reading, parsing and loading into memory, by the client application, the identified user preferences as action scripts;
exporting user preferences by:
locating a cache file for the flash player; and
copying the cache file and saving the copy of the cache file without editing or renaming the cache file;
importing saved user preferences from the exported user preferences in the copy of the cache file;
closing the client browser, and restarting the first file as a client application to load the user preferences; and
rendering the application using the action scripts.

11. The article according to claim 10, wherein the first file enables multimedia, vector graphics, and action scripts.

12. The article according to claim 10, wherein the user preferences are encrypted on the client machine.

13. The article according to claim 10, further including instructions for sending status of preferences saved on the client machine to the client browser, and sending the status to the client application.

14. The article according to claim 10, further including instructions for checking for an update of the user preferences.

15. The article according to claim 10, wherein the user preferences enable for a view at least one of the following: adding, renaming the view, removing the view, ordering multiple views, adding columns inside the view, removing columns inside the view, ordering multiple columns inside the view from a settings menu option, ordering multiple columns inside the view by the user, sorting for each column inside the specific view, a refresh interval for each of the specific views, column width for each visible column, showing and hiding a filter panel specific to the view, showing values inside the filter panel specific to the view.

16. The article according to claim 10, wherein the client machine is coupled to a cloud computing system having cloud components including at least one of a fabric interconnect in a compute layer, a switch in a network layer, and a storage array in a storage layer, the cloud computing system having a management layer.

17. A system, comprising:
a processor; and
a memory containing stored instructions that enable the system to:
request and receive, by a client browser on a client machine, a first file from a server;
run the first file as a client application, which looks to identify user preferences existing on the client machine prior to the request for the first file;
read, parse and load into memory, the identified user preferences as action scripts;
export user preferences by:
locate a cache file for the flash player; and
copy the cache file and saving the copy of the cache file without editing or renaming the cache file;
import saved user preferences from the exported user preferences in the copy of the cache file;
close the client browser, and restarting the first file as a client application to load the user preferences; and
render the application using the action scripts.

* * * * *